US012669810B2

(12) United States Patent
Schulz

(10) Patent No.: US 12,669,810 B2
(45) Date of Patent: Jun. 30, 2026

(54) ORCHESTRATING DETERMINISTIC WORKLOAD EXECUTION

(71) Applicant: ABB Schweiz AG, Baden (CH)

(72) Inventor: Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 738 days.

(21) Appl. No.: 17/972,956

(22) Filed: Oct. 25, 2022

(65) Prior Publication Data

US 2023/0127026 A1    Apr. 27, 2023

(30) Foreign Application Priority Data

Oct. 26, 2021    (EP) ..................................... 21204711

(51) Int. Cl.
G05B 19/418          (2006.01)
(52) U.S. Cl.
CPC ...  G05B 19/41865 (2013.01); G05B 19/4185 (2013.01); *G05B 2219/25421* (2013.01)
(58) Field of Classification Search
CPC ...................... G05B 19/41865; G05B 19/4185
See application file for complete search history.

(56) References Cited

U.S. PATENT DOCUMENTS

| | | | | |
|---|---|---|---|---|
| 10,845,786 | B2 | 11/2020 | Chauvet et al. | |
| 12,175,292 | B2 * | 12/2024 | Cannata | G06F 9/5027 |
| 2012/0198253 | A1 * | 8/2012 | Kato | G06F 1/20 |
| | | | | 713/320 |

| | | | | |
|---|---|---|---|---|
| 2017/0344400 | A1 * | 11/2017 | Birke | G06F 9/45558 |
| 2020/0145337 | A1 * | 5/2020 | Keating | H04L 47/2425 |
| 2020/0183743 | A1 * | 6/2020 | Moore | G06F 9/5061 |
| 2021/0117249 | A1 * | 4/2021 | Doshi | G06F 9/5077 |
| 2023/0135691 | A1 * | 5/2023 | Rohrkemper | H05K 7/20718 |
| | | | | 700/300 |

(Continued)

FOREIGN PATENT DOCUMENTS

WO    WO 2015/169352 A1    11/2015

OTHER PUBLICATIONS

Iyer et al., "A parallel branch-and-bound method for cluster analysis," *Annals of Operations Research*, 90: 65-86 (1999).

(Continued)

*Primary Examiner* — Lewis A Bullock, Jr.
*Assistant Examiner* — Christian M Bakhit
(74) *Attorney, Agent, or Firm* — Fitch Even Tabin & Flannery LLP

(57)          ABSTRACT

A computer-implemented method for orchestrating the deterministic execution of a given workload on at least one computing platform, comprising determining a consumption of at least one computing resource and a consumption of at least one communications resource that result from executing a given workload or a part thereof; determining, from these consumptions and a given set of requirements that relate to the timing, synchronicity and/or availability of executing the given workload or part thereof, at least one performance requirement with respect to execution of the workload or part thereof; and negotiating, with a management entity of the computing platform, execution of the workload or part thereof on the computing platform according to the at least one performance requirement.

15 Claims, 3 Drawing Sheets

(56) References Cited

U.S. PATENT DOCUMENTS

2024/0007414 A1 * 1/2024 Jain ........................ G06F 9/505

OTHER PUBLICATIONS

Pop et al., "The FORA Fog Computing Platform for Industrial IoT," *Information Systems*, 98: 1-26 (May 2021).
European Patent Office, Extended European Search Report in European Patent Application No. 21204711.2, 15 pp. (Apr. 19, 2022).

* cited by examiner

ORCHESTRATING DETERMINISTIC WORKLOAD EXECUTION

CROSS-REFERENCE TO RELATED APPLICATIONS

This patent application claims priority to European Patent Application No. 21204711.2, filed on Oct. 26, 2021, which is incorporated herein in its entirety by reference.

FIELD OF THE DISCLOSURE

The present disclosure relates to the field of orchestrating the execution of workloads, and in particular of control tasks for industrial plants, in computing environments, and in particular edge or cloud computing environments.

BACKGROUND OF THE INVENTION

In every industrial plant, there are control tasks that act upon actuators, and/or upon lower-level controllers, in the plant in order to maintain some observable quantity at a predetermined set-point value. These tasks that are part of an active feedback loop are time-critical. Code execution and communication in the network of the plant need to be bounded to a millisecond level.

In order to guarantee deterministic computation and communication, control tasks are presently mainly executed on dedicated hardware. WO 2015/169 352 A1 discloses a process control system that provides a set of virtual controllers and allocates control functions of a plant to these virtual controllers. Physical controllers from a shared hardware pool are then in turn allocated to execute the control functions allocated to the virtual controllers.

BRIEF SUMMARY OF THE INVENTION

In a general aspect, the present disclosure describes systems and methods that further increase flexibility for deploying control functions for industrial plants in virtualized computing environments.

In one embodiment, the present disclosure describes a computer-implemented method for orchestrating the deterministic execution of a given workload on at least one computing platform. To this end, the computing platform may provide compute instances to execute the workload on. The compute instances may, for example, be virtual computers, and/or execution environments that are specifically adapted for executing containerized workloads.

In the course of the method, a consumption of at least one computing resource and at least one communications resource that result from executing a given workload or part thereof is determined. This consumption may, for example, be determined by means of a code analysis of the workload, or by test-executing this workload in a controlled environment. For example, consumption of a computing resource may comprise a count of executed machine instructions, a count of used CPU and/or GPU cycles, and/or an amount of allocated memory. For example, consumption of a communications resource may comprise an amount of data transmitted via an I/O port or a network, and/or an amount of I/O or network bandwidth used.

At least one performance requirement with respect to execution of the workload or part thereof is determined from said consumption and a given set of requirements that relate to the timing, synchronicity, redundancy, and/or availability of executing the given workload or part thereof. That is, one and the same consumption of resources may translate to very different performance requirements depending on the given set of requirements. For example, given a certain consumption of CPU cycles, a required upper bound on execution time determines how much CPU power in cycles per second needs to be provided. A requirement for synchronicity of two different workloads may translate into a requirement for executing these two workloads on separate CPU cores, rather than having these workloads share one single CPU core. A timing requirement for communication may translate into a requirement for the computing platform to provide guarantees for this timeliness. Conversely, a timing requirement on workload execution may translate to a timing requirement on communication. A requirement for availability may translate into a requirement for redundancy on the computing platform.

BRIEF DESCRIPTION OF THE SEVERAL VIEWS OF THE DRAWING(S)

DETAILED DESCRIPTION OF THE INVENTION

Figure 1:
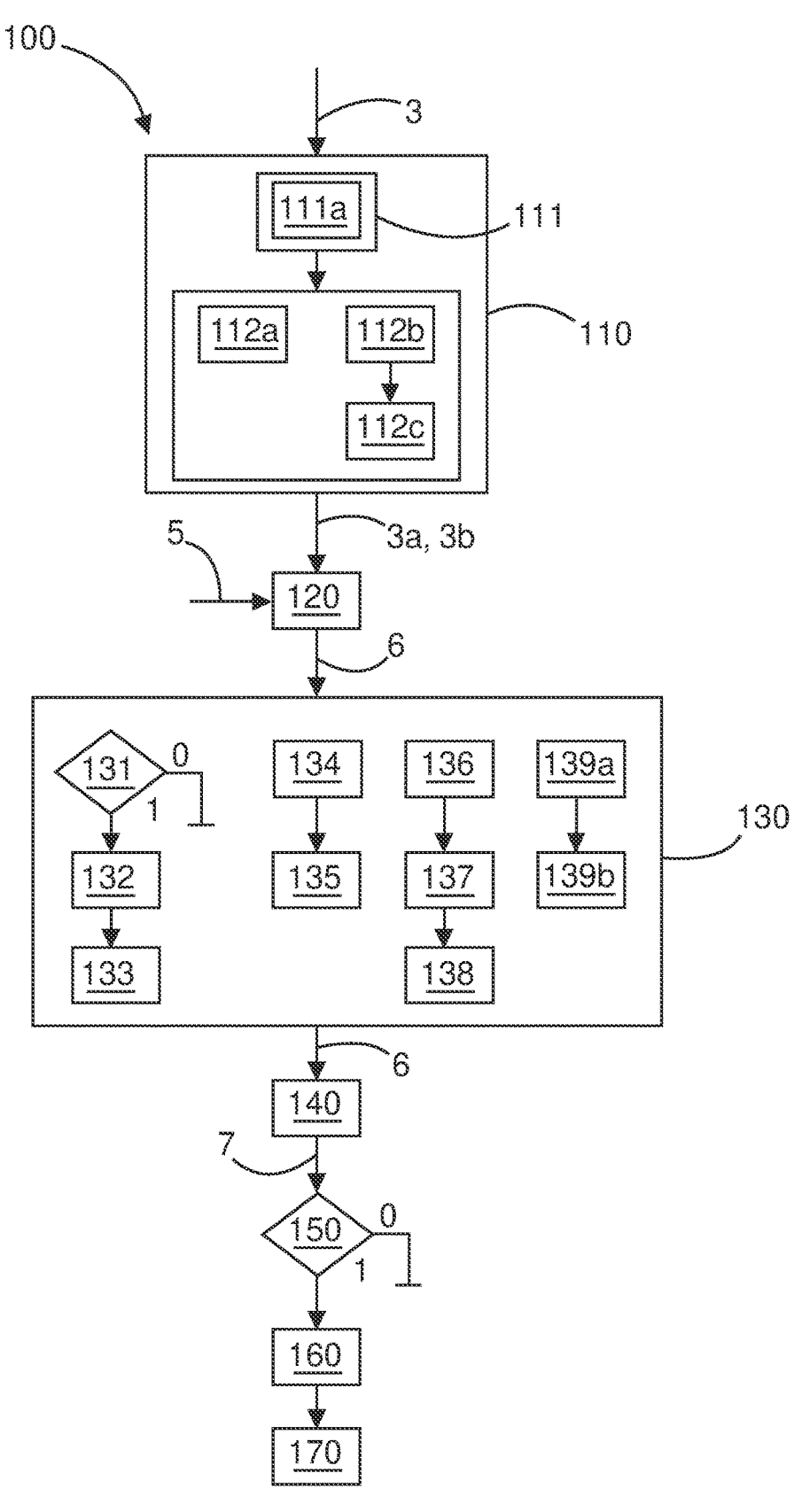
FIG. 1 is a block diagram for and exemplary embodiment of a method 100 for orchestrating the deterministic execution of a workload 3 in accordance with the disclosure.

FIG. 1 is a block diagram illustrating a schematic flow chart of an exemplary embodiment of the method 100 for orchestrating the deterministic execution of a workload 3.

In step 110, a consumption 3a of at least one computing resource and a consumption 3b of at least one communications resource that result from executing a given workload 3 are determined.

According to block 111, this may comprise determining, by analysis of machine code of the workload 3 and/or of by analysis of the behavior of the workload 3, at least one cyclically executed part of the workload 3.

In particular, according to block 111a, a portion of the workload 3 that comprises at least one communication to read input data, at least one computation performed on this input data and at least one communication to write the result of this computation as output data may be determined as a cyclically executed part of the workload 3.

According to block 112, the computing and communications consumptions 3a, 3b may then be specifically determined for a cycle of a cyclically executed part of the workload 3.

In particular, according to block 112a, from the CPU instructions of machine code of the workload 3 executed in each cycle, a quantity of CPU cycles consumed during each cycle, and a quantity of data communicated during each cycle, may be determined.

Alternatively or in combination, according to block 112b, one or more cycles of the cyclically executed part of the workload 3 may be test-executed. According to block 112c, the created computing and/or communications load may then be measured.

In step 120, from the computing and communications consumptions 3a, 3b and a given set of requirements 5 that relate to the timing, synchronicity, redundancy, and/or availability of executing the given workload 3 or part thereof, at least one performance requirement 6 with respect to execution of the workload 3 or part thereof is determined.

In step 130, execution of the workload 3 or part thereof on the computing platform 4 according to the at least one performance requirement 6 is negotiated with a management entity 40 of the computing platform 4. An example configuration of a computing platform 4 and a management entity 40 is further detailed in FIG. 2.

According to block 131, for each compute instance configuration from a set of multiple compute instance configurations available on the computing platform 4, it may be determined whether this compute instance configuration meets the at least one performance requirement 6. If this is the case (truth value 1), to each compute instance configuration that meets the at least one performance requirement 6, a figure of merit based on at least one predetermined criterion may be assigned according to block 132. According to block 133, execution of the workload 3 or part thereof on a compute instance configuration with the best figure of merit may then be requested.

According to block 134, computing and communications related instructions of the workload 3 or part thereof that have no mutual dependencies may be grouped into one or more bound group. According to block 135, execution of each bound group with an upper bound for execution time and/or latency may then be requested from the computing platform 4.

According to block 136, information about the workload 3 and the at least one performance requirement may be provided to a plurality of different management entities 40 of respective computing platforms 4. According to block 137, from each management entity 40, a value of a cost function for executing the workload or part thereof may be received. Execution of the workload 3 or part thereof may then be requested, according to block 138, from the management entity 40 that has provided the best value of the cost function.

According to block 139*a*, a timing requirement for a modularized application may be translated to timing requirements on the execution of a set of workloads 3 and the communication between the workloads 3. According to block 139*b*, these requirements may then be translated to requirements on the time synchronization of compute nodes within an execution environment and between execution environments.

In step 140, the computing platform 4 translates at least one performance requirement 6 received during the negotiating into a set of requirements 7 for resources of the computing platform 4.

It is then checked in step 150 whether these resources are available for allocation in view of the current usage of the computing platform 4. If the resources are available (truth value 1), they are allocated in step 160, and the workload or part thereof is executed using these resources in step 170.

Figure 2:
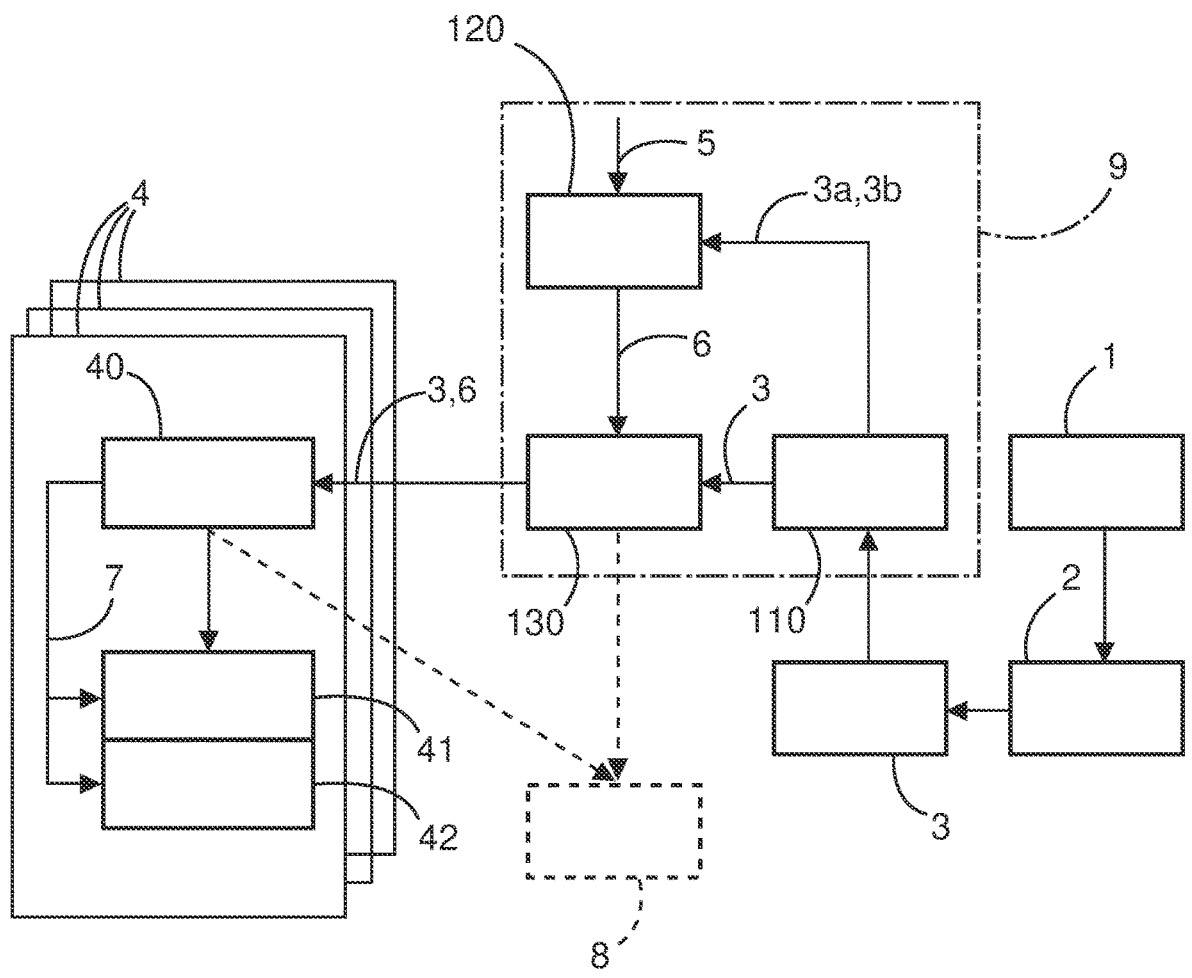
FIG. 2 is a block diagram for an exemplary system for performing the method 100 in accordance with the disclosure.

FIG. 2 shows an exemplary embodiment of a system for performing the method 100.

A software tool 1 creates application code 2, which is packaged into a container and thereby becomes a to-be-executed workload 3. The computing consumption 3*a* and the communications consumption 3*b* of the workload 3 are then determined in method step 110. In method step 120, these consumptions 3*a*, 3*b* are translated into at least one performance requirement 6 based on the given set of requirements 5 that relate to the timing, synchronicity, redundancy, and/or availability of executing the given workload 3 or part thereof.

In method step 130, execution of the workload 3 is negotiated with the management entity 40 of the computing platform 4. The management entity 40 translates the performance requirement 6 into requirements 7 for resources of the computing platform 4. In FIG. 2, two instances 41 and 42 of worker hardware are exemplarily shown. Communication between an orchestrating entity 9 that performs method steps 110 to 130 on the one hand, and the management entity 40 of the computing platform 4 on the other hand, is managed by a deterministic network controller 8.

Figure 3:
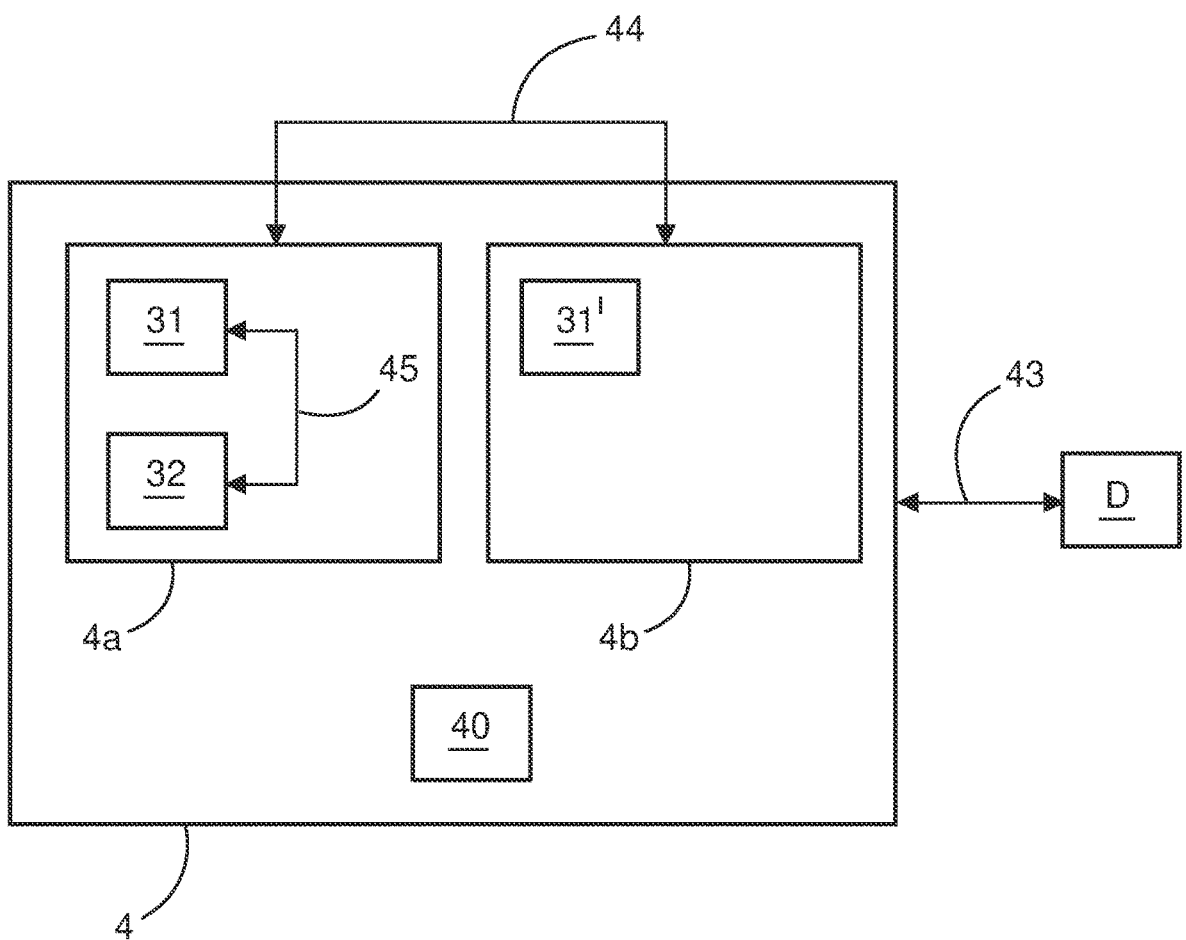
FIG. 3 is a block diagram for an exemplary setting where the method 100 for orchestrating may be applied in accordance with the disclosure.

FIG. 3 shows an exemplary setting where the method 100 for orchestrating may be applied. A compute cluster as computing platform 4 comprises two physical computing devices 4*a* and 4*b*. In the example shown in FIG. 3, the physical computing devices 4*a* and 4*b* are managed by a common management entity 40. Each physical computing device 4*a* and 4*b* may comprise one or more hardware worker instances 41, 42 (not shown in FIG. 3). Device 4*a* runs two workloads 31 and 32 in respective virtualized execution environments. Device 4*b* runs one workload 31' in another virtualized execution environment. Workloads 31 and 32 are part of the same modularized application. Workload 31' is a redundant workload that is a failover instance to workload 31. Therefore, at least workload 31' needs to be executed isochronically with workload 31 for the failover to succeed. Depending on whether there are mutual dependencies between workloads 31 and 32, isochronous execution of these two workloads may be required as well.

In the setting shown in FIG. 3, three different modes of network communication are in use. Communication of the cluster as a whole with an external I/O device is performed over a front-haul link 43, which may, for example, be a 5G link. Communication between the physical computing devices 4*a* and 4*b*, e.g., synchronization of workloads 31 and 31', is performed over an edge cluster box interconnect 44, which may, for example, be a time-sensitive network, TSN. Communication between different workloads 31 and 32 on a same physical computing device 4*a* is performed over a box-internal virtual loop-back interface 45.

Orchestration according to method 100 described above generates abstract requirements regarding computing resources, timing of different workloads, and communication. The management entity 40 of the cloud computing platform 4 translates these abstract requirements into concrete configuration parameters for the used resources. For example, a slice or a time-frequency resource may be reserved in a 5G network without the orchestrating entity needing to know that 5G is being used in the first place. Also, the orchestrating entity does not need to explicitly demand the establishing of a concrete communication link between workloads 31 and 31'. Rather, from the requirement that these workloads be redundant in the sense of hot-failover, it follows that 31' needs to be on a different physical computing device than 31. This in turn translates into a requirement for an appropriate communications link with a particular latency and bandwidth. This latency and bandwidth follow from the size of the data involved.

A requirement for redundancy may also comprise a requirement as to the failover behavior. For example, a spare instance may be required to run as a hot-failover, or it may be reserved to be started up in case of need as a warm-failover or a cold-failover. A hot-failover instance may thus need to be continuously updated with the state of the main instance and the I/O data that this main instance is getting.

A timing requirement for a modularized application (modules being individual workloads contributing to an overall functionality such as control of a production process) may translate to timing requirements on the execution of the set of workloads and the communication between the work-loads. This further translates to requirements on the time synchronization of compute nodes within an environment and between environments (using e.g. IEEE 802.1AS or IEEE 1588v2/PTP) to achieve a global synchronicity of execution prevent time-slips between the nodes during extended periods of execution time as we find them in industrial environments.

The method then further comprises negotiating execution of the workload or part thereof on the computing platform according to the at least one performance requirement with a management entity of the computing platform. Herein, the term "negotiating" is to be understood to mean that there may be more than one round of communication before the execution of the workload on the computing platform is actually started. For example, a request to execute the workload may be declined by the computing platform due to high utilization, or there may be multiple modes of execu-tion to choose from.

By translating a resource consumption into a performance requirement for execution and using this to negotiate with the management entity of the computing platform, it is ensured that the given requirements as to timing, synchron-icity and/or availability even if shared computing resources and/or networks need to be used. This means that there is freedom to use any computing platform that is able to provide guarantees for the performance requirements.

In particular, a virtualized computing platform may be used. Such a virtualized computing platform needs to be able to at least execute code deterministically in the sense that the worst-case execution time is bounded. On top of this, it is advantageous if the platform also provides deterministic communication to the extent that this is required by the at least one performance requirement. For example, the virtu-alized computing platform may be connected to a time-sensitive Ethernet network, TSN, or to a 5G network where guarantees for deterministic communication are also avail-able. For example, the virtualized computing platform may be a 5G Mobile Edge Computing platform on an edge of an industrial plant that is served by a 5G network. Mobile Edge Computing moves compute services from a remote cloud to cellular base stations co-located to the user premises, prom-ising (e.g., by means of 5G) low-latency connectivity to low-latency computation. The platform may also comprise a real-time communication stack that can be executed deter-ministically.

The virtualization platform may use any suitable runtime environment. If the workload is containerized, well-estab-lished runtime and management environments such as Docker or Kubernetes may be used.

The freedom to utilize a virtualized computing platform has a number of advantages, in particular for distributed control systems, DCS, and other automation systems.

For example, existing control solutions may be migrated from end-of-life hardware into a virtualized computing environment, so that the failure of the hardware will no longer put an end to the solution as a whole. New solutions, on the other hand, may be made hardware independent from the start. For new and old applications alike, a cloud-native hardware architecture permits seamless updates and hard-ware replacements, as well as easy scaling by adding more hardware to the hardware pool of the computing platform.

Furthermore, for any applications (not just control appli-cations), the layers of abstraction between the consumption of resources by the workload relieves the maintainer of the computing platform from the need of having intimate knowledge about the application. Consequently, the hard-ware no longer needs to be treated as an application-specific "pet." Rather, it can be treated as application-agnostic "cattle" with a lot less required effort per unit of provided resources.

In one advantageous embodiment, the negotiating spe-cifically comprises:

determining, for each compute instance configuration from a set of multiple compute instance configurations available on the computing platform, whether this compute instance configuration meets the at least one performance requirement;

assigning, to each compute instance configuration that meets the at least one performance requirement, a figure of merit based on at least one predetermined criterion; and requesting execution of the workload or part thereof on a compute instance configuration with the best figure of merit.

In this manner, if there are multiple possible compute instance configurations that are capable of fulfilling the hard performance requirements, a choice may be made that is advantageous with respect to any other suitable criterion, such as total cost. This choice depends on an interplay between the resource consumption, the given set of require-ments and the concrete resources that each compute instance configuration is able to provide. In particular, the given set of requirements may have a great impact on which choice is best.

For example, a first and a second compute instance configuration may both be able to meet the performance requirement, but the first compute instance configuration may accomplish the workload quicker than the second one because it has more processing power and/or more memory, at a higher price per minute than the second compute instance configuration. The straight-forward way of saving costs would be to use the second compute instance configu-ration because it is cheaper per minute. But depending on the concrete consumption pattern of the workload, this may be the wrong decision. If the workload can fully utilize the additional power and/or memory in the first compute instance configuration, the minutes saved due to the speed-up may over-compensate the higher price per minute.

Also, during the establishing of the performance require-ment, it may be established, from a code analysis of the workload, to which extent the workload will benefit from a hardware accelerator (such as a GPU), or whether it is sufficiently parallelized to benefit from a particularly large number of CPU cores that a certain compute instance configuration offers.

In a toy example, suppose the workload is to render a complex processing effect on a video. Whether this process-ing can be accelerated by moving the process to a powerful cloud instance depends on whether the software for the processing effect is GPU-accelerated and/or sufficiently par-allelized. A software that is primarily targeted at home users might only be written to support a maximum of 16 CPU cores because this is the maximum to be expected in a home computer. Running the software on a cloud compute instance with 96 cores will then be a waste of money because the processing will not be accelerated further.

In another example, only a discrete catalogue of compute instance configurations may be available on the computing platform, so when changing from one configuration to the next, an improvement in one aspect may always be wedded to a worsening of another aspect. It then again depends on the concrete consumption pattern of the workload which configuration provides the best overall performance.

In a particularly advantageous embodiment, the workload comprises controlling at least one actuator and/or lower-level controller in an industrial plant such that at least one observable quantity of the industrial plant is maintained at a desired set-point value. As discussed above, in these applications, both the computation and the communication are time-critical. The method ensures that the hard requirements regarding the timing, the synchronicity and/or the availability are met, while allowing the maximum amount of flexibility that is possible within the confines of these hard requirements.

Most of these control workloads have in common that one part of the workload is executed in a cyclic manner over and over again, and this is also the part on which the real-time decisions in the control loop depend. By contrast, parts of the workload that are only activated in response to an event or request are frequently more of an analytic nature. They consume variable length data up to an entire signal history, and then deliver their result after a variable execution time. Because no real-time decision depends on the result, no recurring guarantees regarding the execution time are needed or, rather, it is sufficient for the execution environment to simply inform the user of the compute service about the estimated execution time.

Therefore, in a particularly advantageous embodiment, the computing and communications consumptions are specifically determined for a cycle of a cyclically executed part of the workload. Cyclic on-line algorithms for real-time control typically re-run the same code with limited or no control-flow variation and consume and deliver variable values at each transition between the cycles. This includes regulatory and motion closed-loop control, analytics of process-critical video (e.g., visually monitoring product quality on paper or metals), and in principle regular condition monitoring. This is what was previously run on dedicated control or IPC hardware within the plant because decision loops are time-critical and are closed in real-time on ISA95 level 1 (e.g., taking corrective actions to prevent product quality to fall beyond acceptable limits). This type of application also requires computation to be integrated with deterministic communication.

Cyclic parts of the workload may, for example, be determined by an analysis of the machine code of the workload, and/or by analysis of the behavior of the workload. In this manner, no access to the source code of the workload is necessary. Also, it is determinable from the machine code in a much more fine-grained manner how much of which resource is consumed.

In particular, in a further advantageous embodiment, the determining of a computing consumption and a communications consumption specifically comprises: determining, from the CPU instructions of machine code of the workload executed in each cycle, a quantity of CPU cycles consumed during each cycle, and a quantity of data communicated during each cycle. Given the target computing platform on which the workload will run, it is known from the specification of this platform how many CPU cycles each instruction from the instruction set of the CPU will consume. Likewise, it is evident at which points in the control flow the workload accesses a communications resource (such as a network) and how much data is transferred.

For example, control software according to IEC 61131 has a very sequential instruction flow without loops or dynamic allocation of memory. Therefore, the required computing performance and memory for a cycle may be determined quite precisely.

In another example, if the cycle includes an inference computation of a trained neural network, such as analysis of one frame of a process-critical video, the consumption of computing power and memory is given by the architecture of the neural network and may therefore also be determined very precisely.

In a further advantageous embodiment, a portion of the workload that comprises at least one communication to read input data, at least one computation performed on this input data and at least one communication to write the result of this computation as output data is determined as a cyclically executed part of the workload. This is a frequent behavioral pattern of control loops.

In a further advantageous embodiment, the determining of a computing consumption and a communications consumption comprises test-executing one or more cycles of the cyclically executed part of the workload and measuring the created computing and/or communications load. Code analysis by test-executing directly yields an execution time. Unlike a static analysis of machine code, it is not affected by an optimization of the machine code (e.g., by a compiler of a higher-level language) that makes the code run faster at the price of obscuring its meaning. Machine code of control applications may even be deliberately obfuscated in order to make unauthorized "reverse engineering" more difficult.

In a further advantageous embodiment, the negotiating specifically comprises:

grouping computation and communication related instructions of the workload or part thereof that have no mutual dependencies into one or more bound group; and requesting, from the computing platform, execution of each bound group with an upper bound for execution time and/or latency.

In this manner, it is made easier to parallelize multiple workloads on the multiple cores of one single CPU. Also, the amount of overhead for the scheduling is reduced. In case a request is turned down, the bound groups may be adjusted, e.g., broken down into smaller sub-groups, by the orchestrating entity. Negotiation of this aspect may be performed on any level of detail. For example, rather than merely turning down a request, the computing platform may also inform the orchestrating entity about what part of the request may be fulfilled. To aid this process, the orchestrating entity may assign priorities to different workloads whose executions it is requesting at the same time.

In another particularly advantageous embodiment, the computing platform translates the at least one performance requirement received during the negotiating into a set of requirements for resources of the computing platform. It then checks whether these resources are available for allocation in view of the current usage of the computing platform. If the resources are available for allocation, they are allocated, and the workload or part thereof is executed using these resources. Depending on the requested availability or redundancy-level, checking resource availability includes checking for spare resources for redundancy fail-over. To maintain the cost-advantage of a shared (virtualized) execution environment, a pool of anonymous spare resources is reserved that is smaller than the total of all spares indicated in the negotiation. E.g., when starting 100 workloads with single-redundancy, only resource sets for the 10 most demanding workloads are reserved, allow for any 10 of the 100 resources of the primary workload instances to fail. Requirements for redundancy may, for example, also comprise physical redundancy between different compute instances drawn from said pool. For example, such a requirement may stipulate that the 100 workloads are distributed across at least two different physical computing platforms. Also, the extent to which a requested level of redundancy in terms of compute instances needs to be backed with actual reserved compute instances may be configurable. For example, some of the compute instances in the pool may be instances that are already reserved when creating the pool, and some instances may be activated on-demand when called upon. In this manner, a small risk of not being able to get the additional instance immediately is accepted, but there is a lesser cost for reserved instances. Any requirement for redundancy may also comprise a requirement as to which failures of physical computing platforms need to be tolerated. For each physical computing platform whose failure is to be tolerated, suitable spare capacity needs to be reserved.

In this manner, the shared use of the computing platform is facilitated. In particular, the fact that the computing platform is a shared platform does not require any action on the side of the entity that determines the performance requirement and negotiates with the management entity of the computing platform, except for a handling of the case where the request for execution of the workload cannot be honored due to high usage of the computing platform.

Resources whose availability are checked in this process may, in particular, comprise one or more of the following:

arithmetic-logical unit, ALU, operations on CPU cores;
  floating point operations;
  CPU cycles;
  memory capacity;
  input/output bandwidth;
  a robustness and/or redundancy level;
  a fail-over time; and
  a latency.

Preferably, the entity that determines the performance requirement and negotiates with the management entity of the computing platform is separate from the computing platform. This facilitates the use of computing platforms that are operated by a third party. The computing platform only needs functionality for negotiating the execution of a workload within the confines of one or more performance requirements. But the determining of the performance requirement may also be integrated into the computing platform, so that the negotiating of the execution is performed between two units of one and the same computing platform.

In a further advantageous embodiment, the negotiating comprises:

providing information about the workload and the at least one performance requirement to a plurality of different management entities of respective computing platforms;
  receiving, from each management entity, a value of a cost function for executing the workload or part thereof; and
  requesting execution of the workload or part thereof from the management entity that has provided the best value of the cost function.

In this manner, the specific advantages of each computing platform may be put to use. For example, one particular computing platform may offer a hardware accelerator, such as a GPU, from which execution of the workload might benefit.

The method may be wholly or partially computer-implemented. The invention therefore also relates to one or more computer programs with machine-readable instructions that, when executed on one or more computers and/or compute instances, cause the one or more computers to perform the method. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

LIST OF REFERENCE SIGNS 1 software tool
2 application code
3 containerized workload for execution
3a computing consumption of workload 3
3b communications consumption of workload 3
31, 32 exemplary workloads
31' redundant instance of workload 31
4 computing platform
4a, 4b physical computing devices in computing platform 4
40 management entity of computing platform 4
41, 42 hardware worker instances of computing platform 4
43-45 network links
5 given requirements for execution of workload 3
6 performance requirements for computing platform 4
7 requirements for resources of computing platform 4
8 deterministic network controller
9 orchestrating entity
100 method for orchestrating execution of workload 3
110 determining consumptions 3a, 3b
111 determining cyclically executed part of workload 3
111a determining read-compute-write part as cyclically executed part
112 determining consumptions 3a, 3b for cyclically executed part
112a determining CPU cycles, data communicated for a cycle
112b test-executing cyclically executed part
112c measuring computing and/or communications load of test execution
120 determining performance requirement 6
130 negotiating execution with management entity 40
131 determining whether compute instance meets performance requirement 6
132 assigning figure of merit to compute instance
133 requesting execution on instance with best figure of merit
134 grouping instructions into bound group
135 requesting execution of bound groups
136 providing information to multiple management entities 40
137 receiving values of cost function
138 requesting execution from management entity 40 with best cost value 139*a* translating timing requirements for modularized application 139*b* translating to synchronization requirements 140 obtaining requirements 7 for resources of platform 4

150 checking whether resources are allocable 160 allocating resources 170 executing workload 3 on allocated resources D external I/O device All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for orchestrating a deterministic execution of a given workload on at least one computing platform, comprising the steps of:

determining a consumption of at least one computing resource and a consumption of at least one communications resource that result from executing a given workload or a part thereof, wherein the computing and communications consumptions are specifically determined for a cycle of a cyclically executed part of the workload, and determining, by analysis of machine code of the workload and/or of by analysis of the behavior of the workload, at least one cyclically executed part of the workload;

determining at least one performance requirement with respect to execution of the workload or part thereof that must be met to fulfill a given set of requirements that relate to timing, synchronicity, redundancy, and availability of executing the given workload or part thereof based on the determined consumptions, wherein the redundancy comprises physical redundancy between different compute instances drawn from a pool of anonymous spare resources, and specifying that workloads are to be distributed across at least two different physical computing platforms;

negotiating, with a management entity of the computing platform, execution of the workload or part thereof on the computing platform according to the at least one performance requirement, wherein negotiating comprises translating of the at least one performance requirement into a set of requirements for resources of the computing platform, wherein the set of requirements comprises configuration parameters for the resources;

wherein the negotiating comprises: grouping computation and communication related instructions of the workload or part thereof that have no mutual dependencies into one or more bound group; and requesting, from the computing platform, execution of each bound group with an upper bound for execution time and latency;

executing, by the computing platform, the workload or part thereof based on the at least one performance requirement.

2. The method of claim 1, wherein the negotiating comprises:

determining, for each compute instance configuration from a set of multiple compute instance configurations available on the computing platform, whether this compute instance configuration meets the at least one performance requirement;

assigning, to each compute instance configuration that meets the at least one performance requirement, a figure of merit based on at least one predetermined criterion; and requesting execution of the workload or part thereof on a compute instance configuration with the best figure of merit.

3. The method of claim 1, wherein the workload comprises controlling at least one actuator and/or lower-level controller in an industrial plant such that at least one observable quantity of the industrial plant is maintained at a desired set-point value.

4. The method of claim 1, wherein the determining of the computing consumption and the communications consumption comprises: determining, from central processing unit (CPU) instructions of machine code of the workload executed in each cycle, a quantity of CPU cycles consumed during each cycle, and a quantity of data communicated during each cycle.

5. The method of claim 1, wherein the determining of the computing consumption and the communications consumption comprises test-executing one or more cycles of the cyclically executed part of the workload and measuring the created computing and/or communications load.

6. The method of claim 1, wherein a portion of the workload that comprises at least one communication to read input data, at least one computation performed on this input data and at least one communication to write the result of this computation as output data is determined as the cyclically executed part of the workload.

7. The method of claim 1, wherein the negotiating comprises:

translating a timing requirement for a modularized application to timing requirements on the execution of a set of workloads and the communication between the workloads; and translating these requirements to requirements on the time synchronization of compute nodes within an execution environment and between execution environments.

8. The method of claim 1, further comprising:

checking that the resources are available for allocation in view of the current usage of the computing platform; and when the resources are available for allocation, allocating the resources and executing the workload or part thereof using the resources.

9. The method of claim 8, wherein the checked resources comprise one or more of the following:

arithmetic-logical unit (ALU) operations on central processing unit (CPU) cores;

floating point operations;

CPU cycles;

memory capacity;

input/output bandwidth;

a robustness and/or redundancy level;

a fail-over time; and a latency.

10. The method of claim 1, wherein the negotiating comprises:

providing information about the workload and the at least one performance requirement to a plurality of different management entities of respective computing platforms;

receiving, from each management entity, a value of a cost function for executing the workload or part thereof; and requesting execution of the workload or part thereof from the management entity that has provided the best value of the cost function.

11. A computer program comprising non-transitory machine-readable instructions that, when executed by one or more computers or compute instances, cause the one or more computers or compute instances to perform processes comprising:

determining a consumption of at least one computing resource and a consumption of at least one communications resource that result from executing a given workload or a part thereof, wherein the computing and communications consumptions are specifically determined for a cycle of a cyclically executed part of the workload, and determining, by analysis of machine code of the workload and/or of by analysis of the behavior of the workload, at least one cyclically executed part of the workload;

determining at least one performance requirement with respect to execution of the workload or part thereof that must be met to fulfill a given set of requirements that relate to timing, synchronicity, redundancy, and availability of executing the given workload or part thereof based on the determined consumptions, wherein the redundancy comprises physical redundancy between different compute instances drawn from a pool of anonymous spare resources, and specifying that workloads are to be distributed across at least two different physical computing platforms;

negotiating, with a management entity of the computing platform, execution of the workload or part thereof on the computing platform according to the at least one performance requirement, wherein negotiating comprises translating of the at least one performance requirement into a set of requirements for resources of the computing platform, wherein the set of requirements comprises configuration parameters for the resources;

wherein the negotiating comprises: grouping computation and communication related instructions of the workload or part thereof that have no mutual dependencies into one or more bound group; and requesting, from the computing platform, execution of each bound group with an upper bound for execution time and latency;

executing, by the computing platform, the workload or part thereof based on the at least one performance requirement.

12. The computer program of claim 11, wherein the negotiating further comprises:

determining, for each compute instance configuration from a set of multiple compute instance configurations available on the computing platform, whether this compute instance configuration meets the at least one performance requirement;

assigning, to each compute instance configuration that meets the at least one performance requirement, a figure of merit based on at least one predetermined criterion; and requesting execution of the workload or part thereof on a compute instance configuration with the best figure of merit.

13. The computer program of claim 11, wherein the workload comprises controlling at least one actuator and/or lower-level controller in an industrial plant such that at least one observable quantity of the industrial plant is maintained at a desired set-point value.

14. The computer program of claim 11, wherein the negotiating comprises:

translating a timing requirement for a modularized application to timing requirements on the execution of a set of workloads and the communication between the workloads; and translating these requirements to requirements on the time synchronization of compute nodes within an execution environment and between execution environments.

15. The computer program of claim 11, further comprising:

checking that the resources are available for allocation in view of the current usage of the computing platform; and when the resources are available for allocation, allocating the resources and executing the workload or part thereof using the resources.

* * * * *